Sept. 8, 1936.  B. T. SEBIRE  2,053,376
CLUTCH
Original Filed June 2, 1933
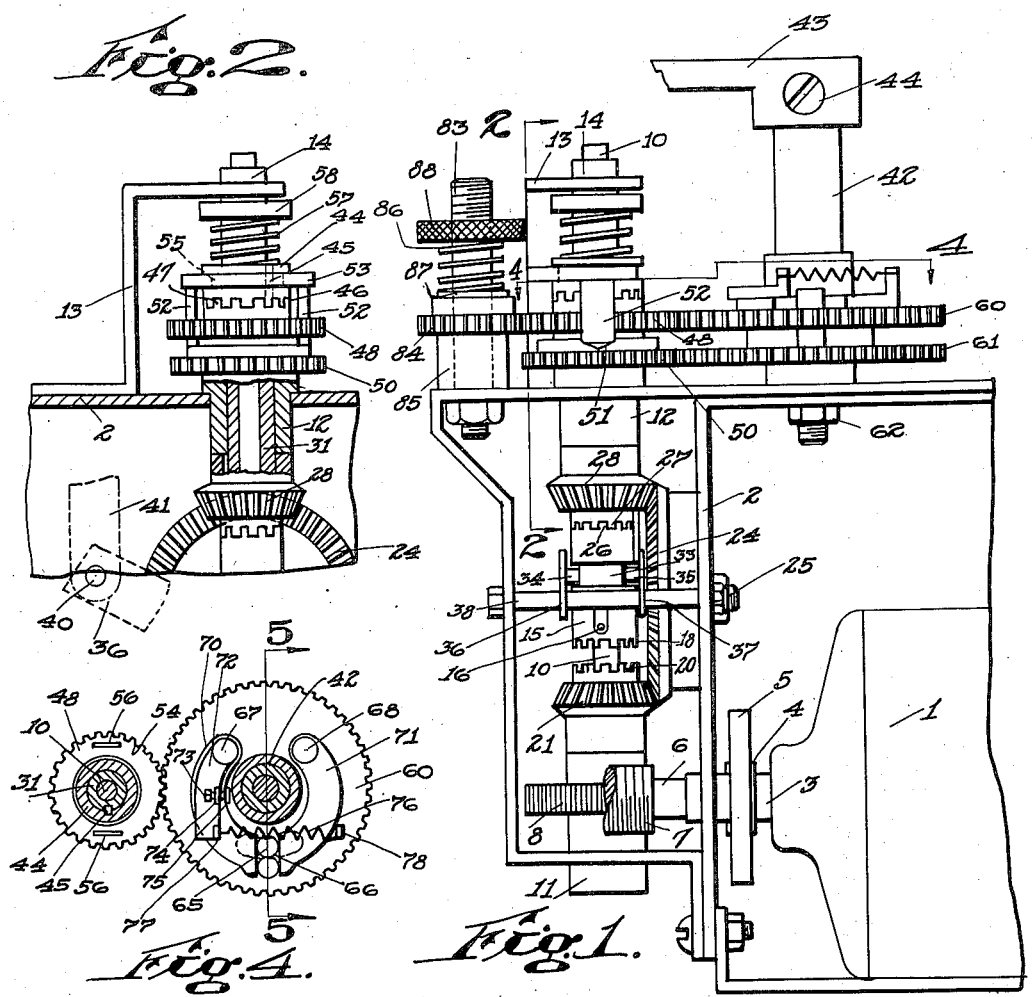
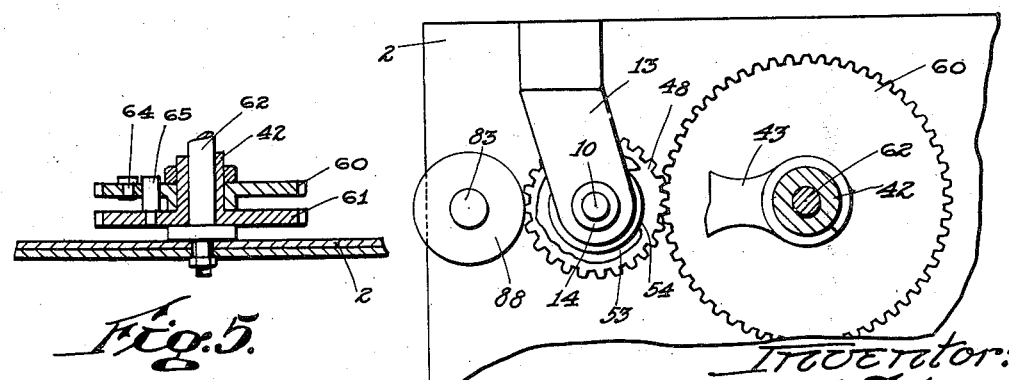
Inventor:
Benjamin T. Sebire
By
Charles A. Warren
Attorney Patented Sept. 8, 1936

2,053,376

UNITED STATES PATENT OFFICE 2,053,376

CLUTCH

Benjamin T. Sebire, Ashland, Mass., assignor of fifty-two one-hundredths to Charles E. Marshall, Hopkinton, Mass.

Original application June 2, 1933, Serial No. 674,079. Divided and this application January 23, 1935, Serial No. 3,077

6 Claims. (Cl. 74—411)

The present invention relates to an automatic clutch mechanism and particularly to a clutch which is automatically released when the torque on the driven shaft reaches a predetermined point, thereby avoiding overloading of the driving element. This application is a division of the copending application Serial No. 674,079, filed June 2, 1933, for an Electric door closer.

The provision of a clutch which is automatically released when the torque on the driving shaft reaches a predetermined maximum limit is particularly desirable in many clutch installations, as for example, in a door opener and closer where the door may be manually opened at a different rate from the normal rate of opening or closing of a door by the driving motor. If no provision were made for disengaging the driving motor from the door, said motor would be overloaded and damaged. It is accordingly one of the principal objects of the present invention to provide a clutch mechanism which is automatically released to prevent overload on the driving member in the event that the normal operation of the driven mechanism is interrupted.

The present invention further provides in a clutch of this type, for the automatic reengagement of said clutch mechanism when normal operation of the driven structure is again possible, and further provides for a positive actuation of the driven structure so long as said driven structure functions normally.

Other and further objects and advantages of the invention will appear from the following description taken in connection with the accompanying drawing, in which—

Fig. 1 is a front elevation of a clutch embodying the invention and shown in connection with a door actuating mechanism.

Fig. 2 is a vertical sectional view on the line 2—2 of Fig. 1.

Fig. 3 is a plan view of the device.

Fig. 4 is a horizontal sectional view along the line 4—4 of Fig. 1.

Fig. 5 is a vertical section along the line 5—5 of Fig. 4.

Like reference characters refer to like parts in the different figures.

The clutch of the invention is shown in connection with an electrically actuated door opening and closing mechanism which involves a driving motor 1 secured to the frame 2 of the mechanism, said motor having a shaft 3 to the end of which the gear 4 is secured. Said gear is in mesh with a gear 5 on the end of a shaft 6 journalled in a portion of the frame 2, and the opposite end of the shaft 6 carries a worm 7 which meshes with a worm gear 8 secured against turning movement on a vertical shaft 10 journalled in bearings 11 and 12 in the frame. A bracket 13 secured to the frame supports a bearing 14 for the upper end of the shaft 10.

A sleeve 15 surrounding the shaft 10 has a slot engageable with a pin 16 in said shaft, whereby said sleeve has a limited axial movement on the pin, but is held against turning movement thereon. The lower end of the sleeve has cogs 18 which engage with corresponding cogs 20 on a bevel gear 21 rotatable on the shaft 10 and held against downward movement by engagement with the hub worm gear 8. The bevel gear 21 meshes with a bevel gear 24 journalled on a stub shaft 25 secured to the frame 2.

Cogs 26 on the upper end of the sleeve 15 engage, when the sleeve is in its upper position, with corresponding cogs 27 on a bevel gear 28 secured to a sleeve 31 surrounding the shaft 10. The bevel gear 28 is in mesh with the bevel gear 24 above referred to.

The sleeve 15 is connected selectively to the bevel gears 21 or 28 by sliding movement of said sleeve on the shaft. To this end the sleeve 15 has an annular groove 33 engaging with pins 34 and 35 on arms 36 and 37 which are journalled at one end on a horizontally extending bolt 38 secured to the frame. The opposite ends of the arms are connected to each other by a pin 40 which also supports one end of a link 41 through which the sleeve 15 may be automatically shifted by suitable mechanism, which is not a feature of the present invention and will not be further described. It is sufficient to note that the drive for the actuation of the device is through the sleeve 31 and that the direction of rotation of this sleeve is controlled by the position of the sleeve 15, as will be apparent.

From the sleeve 31 the drive is through a clutch mechanism, embodying the invention, and hereinafter described, to a sleeve 42 having an arm 43 secured thereto, as by a set screw 44. The arm 43 is connected through a suitable link, not shown, to the door jamb, the frame 2 being secured to the door which is to be actuated by the device. Oscillation of the arm 43 for opening and closing of the door is procured in response to turning movement of the sleeve 31, as will be apparent. According to the present invention the clutch connection between the sleeve 31 and sleeve 42 is such that the door may be manually opened or closed at a rate different from its normal rate of movement as a result of the rotation of the motor 1, and the clutch provides for automatic release thereof to prevent damage to the parts of the device when the door is so opened and closed, or held against opening or closing movement while the motor 1 is in operation.

Referring now to Figs. 1 and 2, the sleeve 31 which surrounds the shaft 10 extends upwardly through the bearing 12, the latter engaging with the bevel gear 28 to support said gear against axial movement. An annular member 44 is axially slidable on the sleeve and is held against turning movement by a key 45. A plurality of cogs 46 on the lower surface of the member 44 engage the corresponding cogs 47 on the hub of a gear 48 journalled on the sleeve. Beneath the gear 48 is journalled a similar gear 50 having a large diameter hub on the upper surface thereof, the underside of the gear 50 engaging with the upper end of the bearing 12 to prevent axial movement of said gear on the sleeve.

V-shaped notches 51 are provided on the upper end of the hub of the gear 50 for engagement with the ends of lugs 52 depending from a plate 53 having a semi-circular recess 54, Fig. 3, which receives the member 44. The latter has an annular groove 55 with which said plate is engageable, said plate being supported by said groove against axial movement on the member 44. The lugs 52 project downwardly through openings 56, Fig. 4, in the gear 48 for engagement with the notches 51. A spring 57 which surrounds the sleeve 31 between the member 44 and a collar 58 secured to the upper end of the sleeve, normally holds the cogs 46 and 47 in engagement. A relative turning movement between the gears 48 and 50 will withdraw the lugs 52 from the notches 51, elevating the member 44 to separate the cogs 46 and 47, and thereby permitting the sleeve 31 to turn without providing a corresponding rotation of the gears 48 and 50.

The gears 48 and 50 are in mesh with similar gears 60 and 61 respectively, on a vertical stud 62 secured to the frame. The gear 61 is integral with the sleeve 42 which extends upwardly from said gear. The gear 60 is journalled on the sleeve 42 and has a downwardly extending hub engageable with the upper surface of the gear 61 for supporting said gears in proper spaced relation. The gear 60 has an upwardly extending pin 64 adjacent the periphery thereof and the gear 61 has a similar projecting pin 65 which extends through an arcuate slot 66 in the gear 60, the pins 64 and 65 being normally retained in radial alinement. To this end, as shown in Fig. 4, the gear 60 has spaced upwardly projecting studs 67 and 68 on which are journalled arms 70 and 71. Said arms extend around the sleeve 42 and are provided with opposed parallel surfaces adjacent the free ends thereof for engagement with the pins 64 and 65. A second arm 72 which is pivotally mounted on the stud 67 has a set screw 73 in an upwardly projecting lug 74 for engagement with a lug 75 on the arm 70. A spring 76 is connected at opposite ends to upwardly extending lugs 77 and 78 on the arms 72 and 71 respectively, and said spring normally urges said arms 70 and 71 toward each other. The tension of the spring 76 which determines the amount of pressure exerted by the arms 70 and 71 on the pins 64 and 65 for retaining said pins in radial alinement is adjusted by turning the set screw 73, thereby varying the relative position of the arms 70 and 72.

A vertical stud 83, Fig. 1, supported by the frame 2, has a gear 84 journalled thereon for engagement with the gear 48. A sleeve 85 of fibrous or other frictional material surrounds the stud 83 below the gear and is held against turning movement on said stud, the end of said sleeve engaging with the hub of the gear 84. A spring 86 surrounding the stud 73 above the gear engages at its lower end with a washer 87 suitably held against rotation on the stud and engaging with the upper end of the hub of the gear 84. A knurled nut 88 engages the upper end of the spring and is in threaded engagement with the upper end of the stud 83, turning movement of the nut 88 providing for varying the tension of the spring 86 for a greater or less braking action between the gear 84 and the frictional sleeve 85.

The gearing above described, including the gears 48 and 50, and the gears 60 and 61 meshing therewith, as well as the gear 84 which acts as a brake, constitutes an automatic clutch which will permit the arm 43 to turn independently of the motion of the vertical shaft 10 or of the sleeve 31. The rotation of the member 43, the direction of which is determined by the position of the sleeve 15, is normally transmitted to the gear 48 through the cooperating cogs 46 and 47, the rotation of the gear 48 procuring a corresponding rotation of the gear 60. The rotation of the latter is transmitted through the pins 64 and 65 to the gear 61 having the integral sleeve 42 to which the arm 43 is secured.

The tension of the spring 76 is normally great enough to transmit the rotation of the gear 60 to the gear 61 without permitting any relative turning movement between said gears. With the gears 60 and 61 turning in unison with the pins 64 and 65 in radial alinement, the gears 48 and 50 also rotate together so that the depending lugs 52 remain in engagement with the notches 51 in the gear 50 and the cogs 46 and 47 accordingly remain in engagement with each other. During the positive rotation of the member 44 from the driving motor the gear 84, which acts as a brake, is driven directly from the gear 48 and has no effect on the relative positions of the gears 48 and 50. It will be apparent that if the sleeve 42 be held against turning movement, the motor will continue to turn the gear 60 until the pins 64 and 65 are out of radial alinement, thereby turning the gears 48 and 50 relative to each other for elevating the plate 53, and accordingly withdrawing the cogs 46 out of engagement with the cogs 47 to permit a continued rotation of the motor 1 without any corresponding movement of the arm 43.

The same operation takes place when the arm 43 is rotated manually at a different speed than the normal rate of movement thereof, the cogs 46 and 47 being automatically withdrawn from engagement with each other to permit a relative turning movement of the arm 43 relative to the driving mechanism. To procure this action the turning movement of the arm 43 procures a corresponding turning movement of the gear 61 and a turning movement of the gear 50 which meshes therewith. The gear 48, however, is held resiliently against turning movement by the braking gear 84, the tension of the spring 86 being such that the gears 60 and 61 will turn relative to each other against the tension of the spring 76. Since the gear 48 is held against turning movement and the gear 50 is positively rotated from the gear 61, a relative turning movement between the gears 48 and 50 takes place, thereby elevating the plate 53 to separate the cogs 46 and 47. The arm 43 may then be shifted in either direction whether or not the motor 1 is in operation.

When the arm 43 is no longer being moved at an abnormal rate of speed, or when said arm is brought to rest when the motor 1 is at rest, the spring 76 urges the arms 70 and 71 together to re-aline the pins 64 and 65 for reestablishing the original relation between the gears 48 and 50. The depending lugs 52 then again engage in the notches 51 and the member 44 is returned to the operative position shown, under the influence of the spring 57.

From the foregoing it will be apparent that the present invention provides a clutch which is automatically released under an overload, or is automatically released when the driven structure is moved at a rate of speed other than the normal rate of speed at which the device is intended to be driven. The clutch moreover automatically reestablishes the positive driving connection between the driving and driven elements when the driven structure is again capable of normal operation. The device provides for automatic release of the clutch when the driving element is stationary and the driven element is actuated by external means.

I claim:

1. In a clutch mechanism, a driving member, a driven member, and a clutch element for procuring a positive turning movement of the driven member, the latter comprising a pair of coaxial rotatable members, means for positively connecting one of said members to the driven member, clutch means connecting said other rotatable member releasably to the driving member, means for resiliently holding said rotatable members against a relative turning movement, and means responsive to a relative turning movement of said rotatable members for disengaging said clutch means to provide for relative movement between the driving member and the rotatable member connected thereto, said resilient means providing for returning said rotatable members to original relative position for reestablishing the connection between the driving member and rotatable member connected thereto.

2. In a clutch mechanism, a driving member, a driven member, and a clutch element for procuring a positive turning movement of the driven member, the latter comprising a pair of coaxial rotatable members, means for positively connecting one of said members to the driven member, clutch means connecting said other rotatable member releasably to the driving member, means for resiliently holding said rotatable members against a relative turning movement for rotation of the driven member, in response to rotation of the driving member, means for applying a predetermined braking action to said other rotatable member, and means responsive to a relative turning movement of said rotatable members for disengaging said clutch means to provide for a relative movement between the driving member and the rotatable member connected thereto, said braking action procuring a relative turning movement of said rotatable members against the action of the resilient means which normally holds said members against relative turning movement, whereby the driving member is disengaged from said other rotatable member when the driven member is rotated at an abnormal rate of speed.

3. In a clutch mechanism, a driving member, a driven member, and a clutch element for connecting said members together, said element comprising a pair of coaxial gears, a clutch by which one of said gears is releasably connected to the driving member, a second pair of coaxial gears meshing with said first pair of gears, means for positively connecting one of said second pair to the driven member, resilient means for normally supporting said second pair of gears against relative turning movement, and means responsive to a relative turning movement of the first pair of gears for disengaging the clutch to release the driving member from the gear connected thereto, said resilient means associated with the said second pair of gears again providing for a relative turning movement when the driven member is not moved at the normal rate, thereby disengaging the driving member from the gear connected thereto.

4. In a clutch mechanism, a driving member, a driven member, and a clutch element for connecting said members together, said element comprising a pair of coaxial gears, a clutch by which one of said gears is releasably connected to the driving member, a second pair of coaxial gears meshing with said first pair of gears, means for positively connecting one of said second pair to the driven member, resilient means for normally supporting said second pair of gears against relative turning movement, and means responsive to a relative turning movement of the first pair of gears for disengaging the clutch to release the driving member from the gear connected thereto, said resilient means connecting said second pair of gears again providing for a relative turning movement when the driven member is not moved at the normal rate, thereby disengaging the driving member from the gear connected thereto, and means for applying a braking action to the gear to which the driving member is releasably connected to hold said gear against turning movement whereby said driving member may be disengaged from said gear when the driven member is rotated at a speed other than its normal rate of movement as determined by the driving member.

5. In a clutch mechanism, a driving member, a driven member, a pair of co-axial gears, a releasable clutch providing a connection between one of said gears and the driving member, a second pair of co-axial gears, meshing with said first pair, means for positively connecting one of said second pair to the driven member, means responsive to a relative turning movement of said first pair of gears for procuring disengagement of said clutch, and resilient means normally preventing relative turning movement of said second pair of gears to retain the clutch in engagement, said resilient means also returning said second pair of gears to original relative position after a relative turning movement thereof for restoring the clutch to operative position.

6. In a clutch mechanism, a driving member, a driven member, a pair of co-axial gears, a releasable clutch providing a connection between one of said gears and the driving member, a second pair of co-axial gears, meshing with said first pair, means for positively connecting one of said second pair to the driven member, means responsive to a relative turning movement of said first pair of gears for procuring disengagement of said clutch, resilient means normally preventing relative turning movement of said second pair of gears to retain the clutch in engagement, said resilient means also returning said second pair of gears to original relative position after a relative turning movement thereof for restoring the clutch to operative position, and means for applying a braking action to the gear of the first pair which is connected by the clutch to the driving member.

BENJAMIN T. SEBIRE.